United States Patent
Tomita

(10) Patent No.: US 8,089,527 B2
(45) Date of Patent: Jan. 3, 2012

(54) IMAGE CAPTURING APPARATUS, IMAGE CAPTURING METHOD AND STORAGE MEDIUM

(75) Inventor: Hiroki Tomita, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 267 days.

(21) Appl. No.: 12/569,010

(22) Filed: Sep. 29, 2009

(65) Prior Publication Data

US 2010/0079623 A1    Apr. 1, 2010

(30) Foreign Application Priority Data

Sep. 29, 2008   (JP) ................. 2008-250487

(51) Int. Cl.
H04N 5/228   (2006.01)
H04N 5/262   (2006.01)
H04N 5/222   (2006.01)
G06K 9/00    (2006.01)
G06K 9/46    (2006.01)
G06K 9/62    (2006.01)

(52) U.S. Cl. ............. 348/222.1; 348/240.3; 348/240.99; 348/333.12; 348/333.11; 382/181; 382/118; 382/190; 382/209

(58) Field of Classification Search ............. 348/240.99, 348/240.1, 240.3, 333.03, 333.08, 333.11, 348/333.12, 218.1, 222.1; 382/190, 118, 382/181, 173, 165, 167, 256, 284, 219, 220, 382/209

See application file for complete search history.

(56) References Cited

U.S. PATENT DOCUMENTS

| 5,850,470 | A | * | 12/1998 | Kung et al. | 382/157 |
| 2004/0095485 | A1 | * | 5/2004 | Ueda et al. | 348/240.1 |
| 2006/0187306 | A1 | * | 8/2006 | Matsui | 348/207.11 |
| 2006/0285034 | A1 | * | 12/2006 | Aratani et al. | 349/90 |
| 2008/0055429 | A1 | * | 3/2008 | Yoshida | 348/240.99 |
| 2008/0129857 | A1 | * | 6/2008 | Vau et al. | 348/345 |

FOREIGN PATENT DOCUMENTS

| JP | 2003-92726 A | 3/2003 |
| JP | 2003-234944 A | 8/2003 |
| JP | 2005-294951 A | 10/2005 |
| JP | 2006-237803 A | 9/2006 |
| JP | 2008-505575 T | 2/2008 |

OTHER PUBLICATIONS

Japanese Office Action dated Jul. 13, 2010 and English translation thereof, issued in counterpart Japanese Application No. 2008-250487.

* cited by examiner

*Primary Examiner* — Lin Ye
*Assistant Examiner* — Marly Camargo
(74) *Attorney, Agent, or Firm* — Holtz, Holtz, Goodman & Chick, PC

(57) ABSTRACT

A digital camera includes a CCD for image capturing a subject and obtaining a reference image thereof, a lens optical system, a zoom drive unit, and an AF drive unit for performing an optical zoom action, a facial detection portion for detecting a face from the reference image captured by the CCD, and a control unit for calculating, as a set magnification ratio, a maximum magnification ratio according to which the face detected by the facial detection portion is included in an angle of view of the image capturing unit, performing zoom magnification processing up to the set magnification ratio, and causing the CCD to image again and obtain a magnified image.

11 Claims, 5 Drawing Sheets

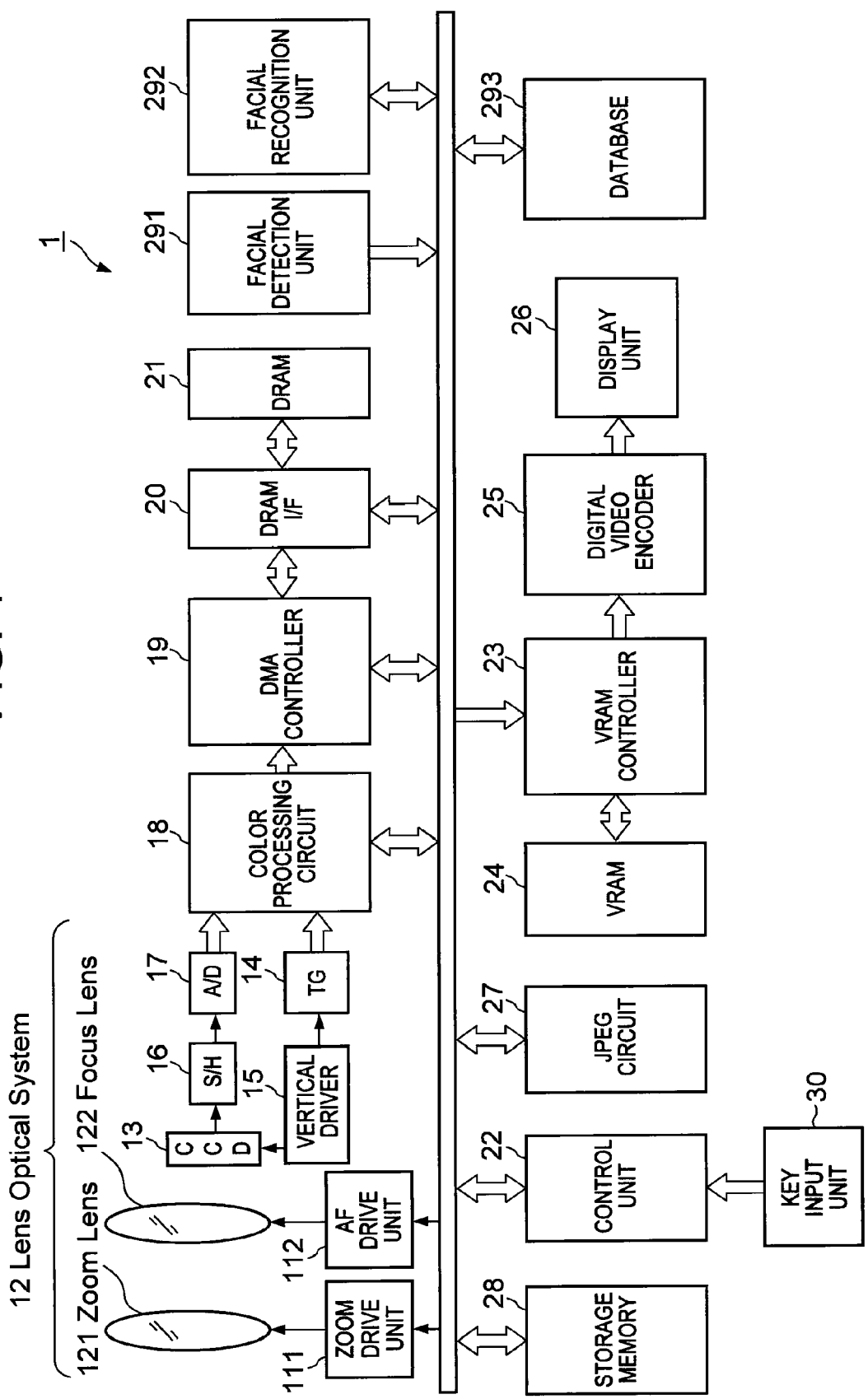

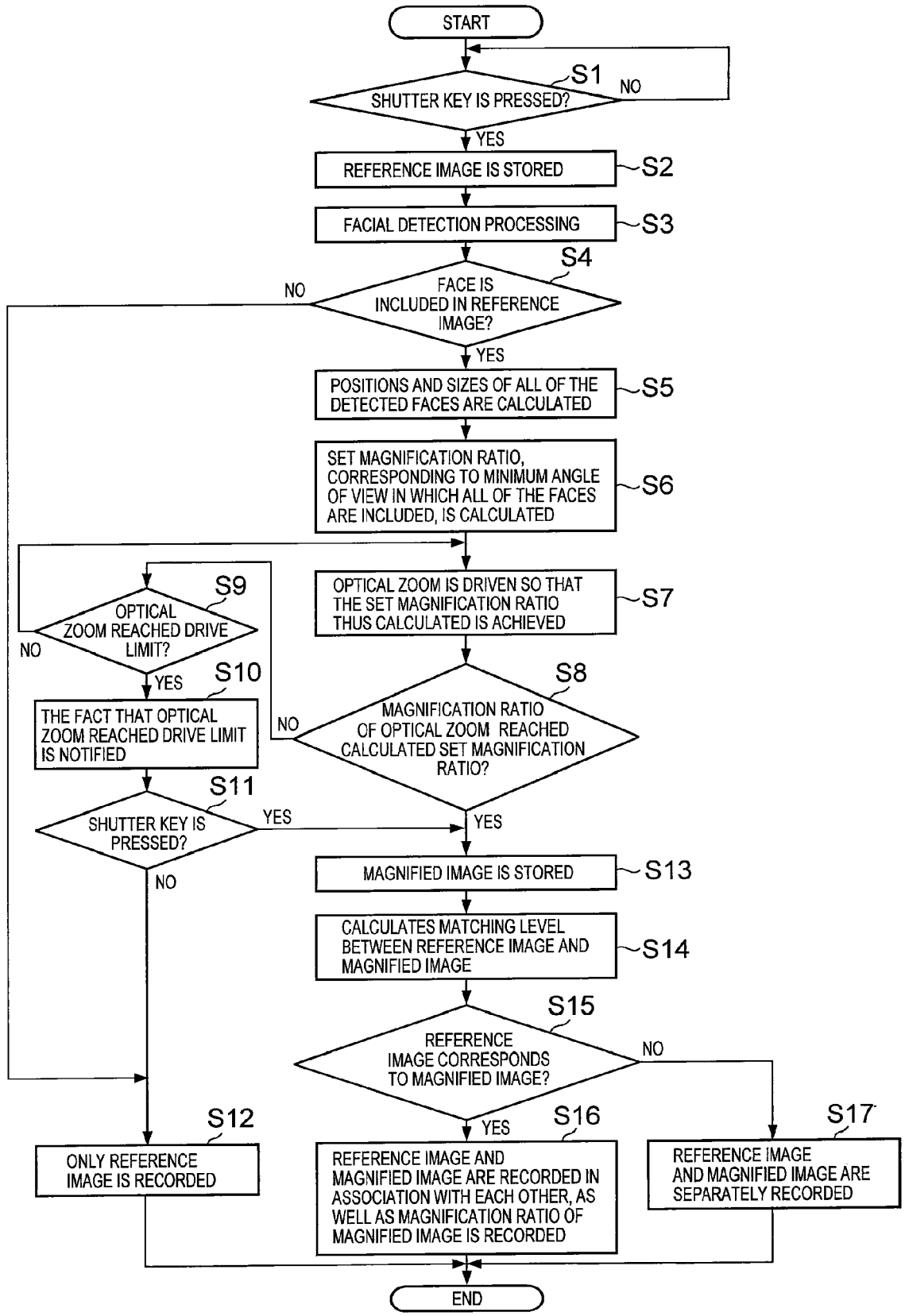

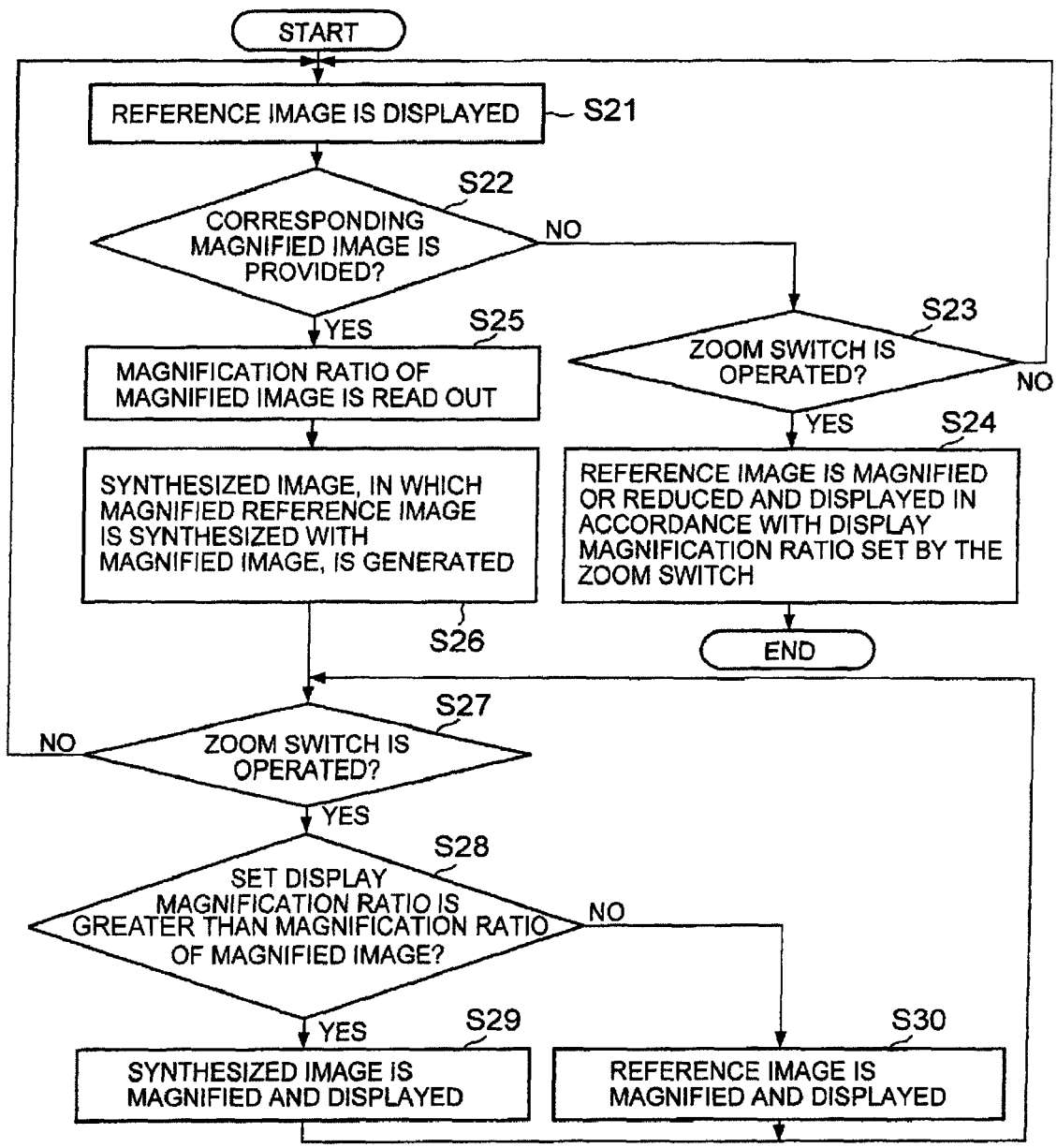

FIG. 5
(a)
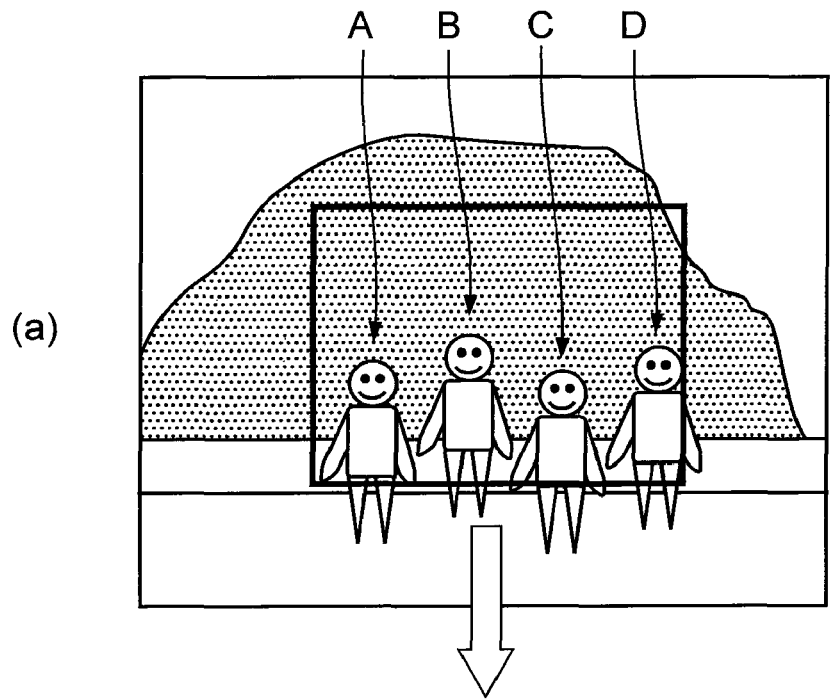
(b)
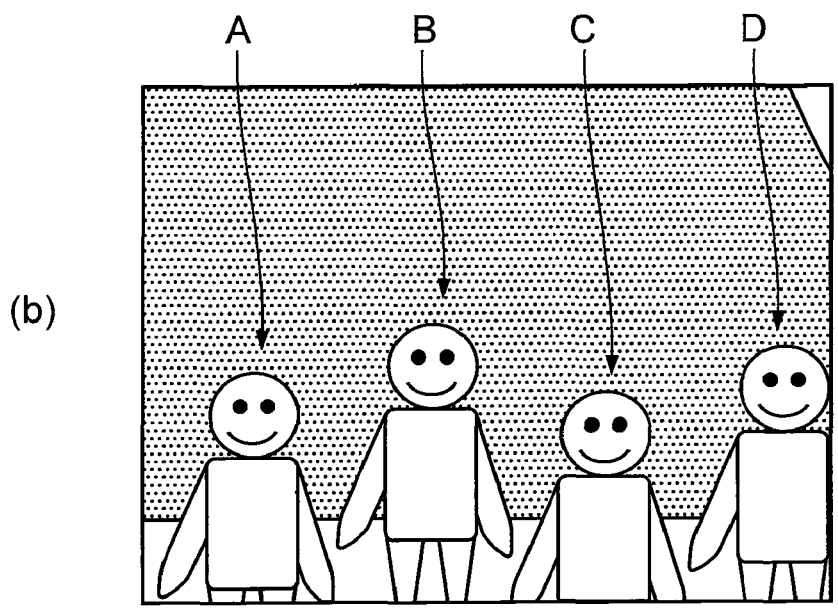

IMAGE CAPTURING APPARATUS, IMAGE CAPTURING METHOD AND STORAGE MEDIUM

This application is based on and claims the benefit of priority from Japanese Patent Application No. 2008-250487, filed on 29 Sep. 2008, the content of which is incorporated herein by reference.

BACKGROUND OF THE INVENTION

1. Field of the Invention

The present invention relates to an image capturing apparatus such as a digital camera having an optical zoom function, an image capturing method, and a storage medium having stored therein a program thereof.

2. Related Art

Conventionally, there exists an image capturing apparatus that crops only a facial portion of a person from a captured image and separately generates the captured image and a facial image cropped from that portion. One example is an image capturing apparatus that, by recognizing a facial region, cuts out a portion corresponding to the facial region from a captured image with a size and an inclination corrected, and stores the facial image as a separate image file (see Japanese Unexamined Patent Publication No. 2003-92726). With this image capturing apparatus, it is possible to cut out only a facial image even in a case in which the facial image is positioned at an edge of the captured image.

However, in the above-described method, there is a problem in that, since the facial image is cut out from the captured image, the resolution of the cut-out facial image itself decreases.

In particular, in a case in which a person has been captured with a background as a subject, the size that the face of the person occupies in the captured image is small, and therefore the resolution of the facial capture decreases by a great degree if the aforementioned cut-out process is carried out.

SUMMARY OF THE INVENTION

The present invention has been invented in view of the above-mentioned kind of background, and it is an object of the present invention to provide an image capturing apparatus and an image capturing method, capable of acquiring a captured image and an image with a magnified characteristic region in that captured image without reducing the resolution of the image, and a storage medium having stored therein a program thereof.

In order to achieve the above-mentioned object, in accordance with one aspect of the present invention, there is provided an image capturing apparatus, comprising: an image capturing unit; a detection unit for detecting a characteristic region from a first image captured by the image capturing unit; a calculation unit for calculating, as a set magnification ratio, a maximum magnification ratio according to which the characteristic region detected by the detection unit is included in an image capturing angle of view of the image capturing unit; a zoom control unit for performing optical zoom magnification processing; an image capturing control unit for controlling the image capturing unit so as to image a second image with the image capturing angle of view that is zoom magnification processed by the zoom control unit up to the set magnification ratio calculated by the calculation unit; and a recording unit for recording the first image and the second image.

In order to achieve the above-mentioned object, in accordance with another aspect of the present invention, there is provided an image capturing apparatus, comprising: an image capturing unit; a detection unit for detecting a face of a person from a first image captured by the image capturing unit; a smiling face score calculation unit for calculating a smiling face score of the face of the person detected by the detection unit; a calculation unit for calculating, as a set magnification ratio, a maximum magnification ratio according to which the face of the person detected by the detection unit is included in an image capturing angle of view of the image capturing unit; a zoom control unit for performing optical zoom magnification processing; an image capturing control unit for controlling the image capturing unit so as to image a second image with the image capturing angle of view that is zoom magnification processed by the zoom control unit up to the set magnification ratio calculated by the calculation unit, in a case in which the smiling face score calculated by the smiling face score calculation unit from the first image is greater than or equal to a predetermined threshold value; and a recording unit for recording the first image and the second image.

In order to achieve the above-mentioned object, in accordance with another aspect of the present invention, there is provided an image capturing method, comprising: an image capturing step of causing an image capturing unit to image a first image; a detection step of detecting a characteristic region from a first image captured in the image capturing step; a calculation step of calculating, as a set magnification ratio, a maximum magnification ratio according to which the characteristic region detected in the detection step is included in an image capturing angle of view of the image capturing unit; a zoom control step of performing optical zoom magnification processing; and an image capturing control step of controlling the image capturing unit so as to image a second image with the image capturing angle of view that is zoom magnification processed in the zoom control step up to the set magnification ratio calculated in the calculation step.

In order to achieve the above-mentioned object, in accordance with another aspect of the present invention, there is provided an image capturing method, comprising: an image capturing step of causing an image capturing unit to image a first image; a detection step of detecting a face of a person from the first image captured in the image capturing step; a smiling face score calculation step of calculating a smiling face score of the face of the person detected in the detecting step; a calculation step of calculating, as a set magnification ratio, a maximum magnification ratio according to which the face of the person detected by the detection step is included in an image capturing angle of view of the image capturing unit; a zoom control step of performing optical zoom magnification processing; and an image capturing control step of controlling the image capturing step so as to image a second image with the image capturing angle of view that is zoom magnification processed in the zoom control step up to the set magnification ratio calculated by the calculation step, in a case in which the smiling face score calculated in the smiling face score calculation step from the first image is greater than or equal to a predetermined threshold value.

In order to achieve the above-mentioned object, in accordance with another aspect of the present invention, there is provided a storage medium having stored therein a program executable by a computer, to cause the computer to function as: an image capturing unit; a detection unit for detecting a characteristic region from a first image captured by the image capturing unit; a calculation unit for calculating, as a set magnification ratio, a maximum magnification ratio according to which the characteristic region detected by the detection unit is included in an image capturing angle of view of the image capturing unit; a zoom control unit for performing optical zoom magnification processing; and an image capturing control unit for controlling the image capturing unit so as to image a second image with the image capturing angle of view that is zoom magnification processed by the zoom control unit up to the set magnification ratio calculated by the calculation unit.

In order to achieve the above-mentioned object, in accordance with another aspect of the present invention, there is provided a storage medium having stored therein a program executable by a computer, to cause the computer to function as: an image capturing unit; a detection unit for detecting a face of a person from a first image captured by the image capturing unit; a smiling face score calculation unit for calculating a smiling face score of the face of the person detected by the detection unit; a calculation unit for calculating, as a set magnification ratio, a maximum magnification ratio according to which the face of the person detected by the detection unit is included in an image capturing angle of view of the image capturing unit; a zoom control unit for performing optical zoom magnification processing; and an image capturing control unit for controlling the image capturing unit so as to image a second image with the angle of view that is zoom magnification processed by the zoom control unit up to the set magnification ratio calculated by the calculation unit, in a case in which the smiling face score calculated by the smiling face score calculation unit is greater than or equal to a predetermined threshold value.

According to the present invention, by a user only pressing a shutter key once, a digital camera 1, in addition to a first image including a characteristic region, automatically images a second image with this characteristic region magnified. As a result, it is possible to acquire a captured image and an image with a characteristic region in the captured image without reducing the resolution thereof.

BRIEF DESCRIPTION OF THE DRAWINGS

FIG. 1 is a block diagram showing a configuration of a digital camera as an image capturing apparatus related to an embodiment of the present invention;

FIG. 2 is a flowchart illustrating an operation of the digital camera related to the embodiment in an image capturing mode;

FIG. 3 is a diagram showing a relationship between a reference image and a magnified image stored in the digital camera related to the embodiment;

FIG. 4 is a flowchart illustrating an operation of the digital camera related to the embodiment in a playback mode;

FIG. 5 is a diagram showing examples of a reference image and a magnified image related to the embodiment;

DETAILED DESCRIPTION OF THE INVENTION

Figure 6:
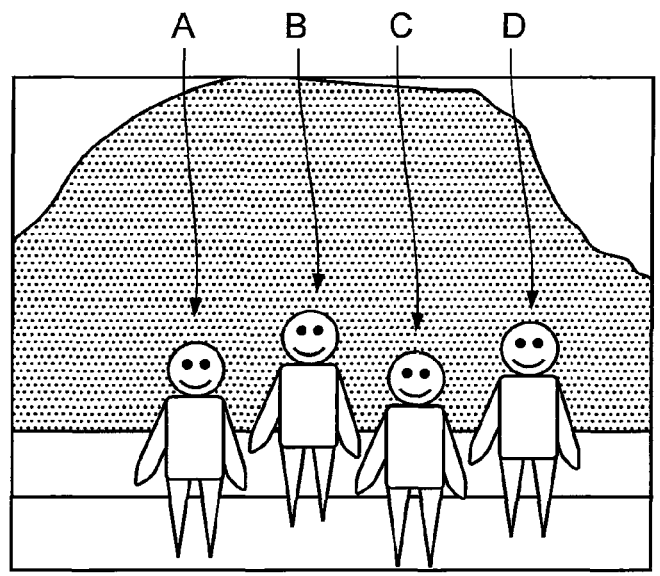
FIG. 6 is a diagram showing an example of magnifying a reference image up to a display magnification ratio, related to the embodiment.

Hereinafter, one embodiment of the present invention is described with an example of a digital camera to which the present invention is applied.

Embodiment

Configuration of Digital Camera

FIG. 1 is a block diagram showing a configuration of a digital camera 1 as an image capturing apparatus related to an embodiment of the present invention.

This digital camera 1 has a recording mode including an image capturing mode for performing image capturing as a basic operation mode, and a playback mode for playing back a captured image.

This digital camera 1 includes a lens optical system 12 including a zoom lens 121 and a focus lens 122, a zoom drive unit 111 for moving the zoom lens 121 to cause to perform an optical zoom action, an AF drive unit 112 for moving the focus lens 122 to cause to perform a focusing action, a CCD 13 which is an image capturing device, a timing generator (TG) 14, a vertical driver 15, a sample/hold circuit (S/H) 16, an A/D converter 17, a color processing circuit 18, a DMA (Direct Memory Access) controller 19, a DRAM interface (I/F) 20, DRAM 21, a control unit 22, a VRAM controller 23, a VRAM 24, a digital video encoder 25, a display unit 26, a JPEG circuit 27, a storage memory 28, a facial detection unit 291, a facial recognition unit 292, a database 293, and key input unit 30.

In the recording mode, in accordance with a control signal from the control unit 22, the zoom lens drive motor, which is not shown, is driven by the zoom drive unit 111, and the zoom lens 121 is moved back and forth along an optical axis, so that a magnification ratio (image capturing magnification ratio) of an image to be formed in the CCD 13 is changed. Likewise, the auto-focus drive motor, which is not shown, is driven by the AF drive unit 112, and the focus lens 122 is moved so that a focusing action is performed. Furthermore, by means of the timing generator (TG) 14 and the vertical driver 15, the CCD 13 is driven, so that one frame worth of a photoelectric conversion output corresponding to the optical image formed in each constant period is output.

The CCD 13 is a solid-state image capturing device adapted to capturing an image of a subject, and more specifically, to image images of several tens of frames each second. It should be noted that the image capturing device is not limited to a CCD, but may be a solid state image capturing device such as, for example, a CMOS (Complementary Metal Oxide Semiconductor).

This photoelectric conversion output, after being suitably gain-adjusted in a state of a signal of analog values for each primary color component of RGB, is sampled and held by the sample/hold circuit (S/H) 16. Then, the photoelectric conversion output is converted to digital data by the A/D converter 17, and subjected to color processing including image interpolation processing and luminance correction processing by the color processing circuit 18. Thus, a digital-valued luminance signal Y and chrominance signals Cb and Cr are generated, and output to the DMA (Direct Memory Access) controller 19.

The DMA controller 19 DMA-transfers the luminance signal Y and the chrominance signals Cb and Cr output by the color processing circuit 18, using the composite synchronization signal, memory write enable signal, and clock signal from the same color processing circuit 18, through the DRAM interface (I/F) 20 to the DRAM 21, which is used as buffer memory.

The controller 22 controls the whole operation of the digital camera 100, and is configured of a CPU or MPU (hereinafter a "CPU"), a program storage memory such as a flash memory or the like for storing operation programs and the like to be executed by the CPU, and a RAM or the like to be used as a working memory. The controller 22, after finishing DMA-transferring of the above-mentioned luminance signal and chrominance signal to the DRAM 21, reads out these luminance and chrominance signals from the DRAM 21 through the DRAM interface 20, and writes via the VRAM controller 23 to the VRAM 24.

The digital video encoder 25 periodically reads out the above-mentioned luminance and chrominance signals from the VRAM 24 through the VRAM controller 23, and based on these data, generates a video signal, and outputs the video signal to the above-mentioned display unit 26.

As mentioned above, the display unit 26 functions as a monitor display unit (electronic finder) while operating in the image capturing mode. The display unit 26 performs display operation based on a video signal from the digital video encoder 25, so as to display live-view images on an LCD monitor screen in real time in accordance with image information loaded from the VRAM controller 23 at each time point.

In accordance with a recording instruction, the controller 22, after completion of DMA-transferring to the DRAM 21 of one frame worth of the luminance and chrominance signals loaded from the CCD 13 at the time point, immediately shuts down the route from the CCD 13 to the DRAM 21, and transitions to a recording state.

In this recording state, the controller 22 reads out one frame worth of the luminance and chrominance signals written in the DRAM 21 through the DRAM interface 20 in units called basic blocks of 8 pixels high by 8 pixels wide for each of the Y, Cb, and Cr components, writes them to the JPEG (Joint Photographic Coding Experts Group) circuit 27. Then, the signals are data-compresses by this JPEG circuit 27 by way of such processing as ADCT (Adaptive Discrete Cosine Transform) and Huffman encoding, which is an entropy encoding. The acquired code data is read out from the JPEG circuit 27 as a data file of one image, and recorded in the storage memory 28. Following the completion of compression processing of luminance and chrominance signals and writing of all compressed data of one frame worth to the storage memory 28, the controller 22 again activates the route from the CCD 13 to the DRAM 21.

Furthermore, in a playback mode, the controller 22 selectively reads out image data recorded in the storage memory 28, decompresses the compressed image data in exactly reverse procedure to the procedure of the data compression carried out by the JPEG circuit 27 in an image capturing mode, and then stores the uncompressed image data in the VRAM 24 through the VRAM controller 23. The controller 22 periodically reads out the image data from this VRAM 24, generates a video signal based on these image data and plays back and outputs thereof at the display unit 26.

The above-mentioned JPEG circuit 27 can carry out data compression at a plurality of compression ratios. From among recording modes, there are a high-resolution recording mode corresponding to a low compression ratio (usually called "high-resolution," "fine," "normal," or the like) and a low-resolution recording mode corresponding to a high compression ratio (usually called "economy" and the like). In addition, the recording modes correspond from a high pixel number to a low pixel number. For example, there are such recording pixel sizes as SXGA (1600×1200), XGA (1024×768), SVGA (800×600), VGA (640×480), QVGA (320×240), and the like.

The storage memory 28 is constituted by such storage media as internal memory (flash memory), a hard disk, a removable memory card, or the like, and stores image data, image capturing information, or the like.

The facial detection portion 291 executes facial detection processing that detects a face (facial region) as a characteristic region from an image of one frame worth. In a case in which a plurality of faces is included in an image, the facial detection portion 291 detects a position and a size of each face in the plurality of faces. As a detection method and a smiling face score calculation method for the face, it is possible to use a method in the public domain. It should be noted that a dedicated circuit may be mounted for this facial detection processing, or a facial detection program may be executed at the controller 22.

The facial recognition unit 292 calculates a matching level between two faces respectively included in a first image and a second image detected in the facial detection unit 291, and determines whether the matching level is greater than or equal to a predetermined threshold. More specifically, for example, a distance difference (or a square mean of the distance difference) between two facial regions is assumed to be a similarity level and a matching level is determined. Then, in a case in which the matching level is greater than or equal to a predetermined threshold value, it is determined that the two faces match. It should be noted that a separate and dedicated circuit (hardware) may be mounted for this facial recognition unit 292, or a program (software) for the above-mentioned processing may be executed in the controller 22. Furthermore, a smiling face score for the detected face may be calculated. For this smiling face score calculation unit, it is possible to use a method in the public domain.

A database 293 stores facial recognition data, image quality parameters, or the like, and is referred to by the facial recognition unit 292. This database 293 is capable of such updates as new registration, adjustment, deletion, and the like using a key input operation by the user.

The key input unit 30, which is not shown, is configured such as of a mode dial, a cursor key, a SET key, zoom buttons (W button and T button), a shutter key, and a power button, as well as a key processing unit (not shown) for generating operation signals of operated keys when those keys are operated and transferring thereof to the controller 22.

The mode dial is designed to perform selection of an image capturing mode or a playback mode. It is possible for the user to operate the mode dial, and to select such image capturing modes as (still image) ordinary image capturing mode, macro image capturing mode, consecutive-shot mode, snap-shot mode, . . . , video image capturing mode, etc.

The cursor key is a key operated to designate menus, icons, or the like displayed on an LCD monitor screen, with a cursor, for mode configuration, menu selection, and the like. It is possible to move the cursor up, down, left, or right by operation of the cursor key.

Furthermore, the SET key is a key pressed at a time of selecting and setting items designated by the cursor by way of the cursor key. Furthermore, the SET key may be used as a confirmation key.

The zoom buttons are used in zoom operation, and in a case of optical zooming, in response to an operation of the zoom buttons, the zoom lens is moved to the wide (wide angle)-side or the tele (telephoto)-side. This unit that the zoom value is determined in response to the operation of the zoom button. Following changes in the zoom value, the angle of view actually changes, and a wide angle-of-view image or a telephoto image is displayed on the LCD monitor screen.

The shutter key performs a release operation at a time of image capturing and has a two-stage stroke. The shutter key generates a focus instruction signal for performing auto-focusing (AF) and auto-exposure (AE) at a first-stage operation (half-pressed state), and generates an image capturing instruction signal for performing image capturing processing at a second-stage operation (full-pressed state). The menu keys are keys operated in a case of displaying selection menus or icons that can be processed at each point in time.

In addition, the above-mentioned controller 22 extracts processing programs or menu data corresponding to each mode stored in the program storage memory such as of the flash memory in response to state signals from the key input unit 30, and performs execution control of each function of the digital camera 1.

More specifically, the controller 22 drives the CCD 13 and images a first image in recording mode. In addition, when a face is detected from the captured first image by the facial detection unit 291, a maximum magnification ratio according to which the detected face is included in an angle of view (magnification ratio in which the angle of view becomes minimum) is calculated as a set magnification ratio, and zoom magnification processing driving the zoom drive unit 111 up to this set magnification ratio is performed. Then, the CCD 13 is driven again, and the second image is captured. Furthermore, as a method of calculating the maximum magnification ratio according to which the detected face is included in the angle of view, a method can be considered such as, in advance, by increasing the magnification ratio for each pixel in the angle of view, calculating a maximum magnification ratio at which a region corresponding to that pixel can be included in the angle of view at a time of standard magnification, (×1 magnification ratio), and based on those calculation results, calculating, from the pixels of the region corresponding to the detected face, a maximum magnification ratio according to which the face is included in the angle of view.

Furthermore, in a case in which the two faces respectively included in the first image and the second image are determined to match by means of the facial recognition unit 292, the controller 22 associates the first image and the second image, and performs recording by means of the storage memory 28.

Moreover, in a case in which the set magnification ratio exceeds the maximum magnification ratio for which magnification ratio is possible by means of the zoom drive unit 111, this fact is notified.

In addition, the controller 22, in playback mode, magnifies the first image to the same magnification ratio as the second image, and generates a composite image, in which a portion corresponding to the second image in the magnified first image is replaced with the second image. Then, it is determined whether the display magnification ratio specified by the zoom button is greater than or equal to a magnification ratio of the second image to the first image. In a case in which it is determined that the display magnification ratio is greater than or equal to the image capturing magnification ratio, the composite image is magnified up to the display magnification ratio and displayed on the display unit 26. On the other hand, in a case in which it is determined that the display magnification ratio is less than the image capturing magnification ratio, the first image is displayed magnified up to the display magnification ratio on the display unit 26.

FIG. 2 is a flowchart illustrating an operation of the digital camera 1 in image capturing mode.

When the mode setting key mounted on the key input unit 30 is operated and image capturing mode is set, the controller 22 reads out a program for executing processing illustrated in the flowchart shown in FIG. 2 from the program storage memory. The controller 22, in accordance with this program, performs various processing in the flowchart shown in FIG. 2.

First, it is determined by the controller 22 whether the shutter key is pressed (Step S1), and in a case in which this determination is YES, the control transitions to Step S2, and in a case in which this determination is NO, the control returns to Step S1.

In Step S2, image capturing processing is performed using the CCD 13 and the image is captured. This captured image is set by the controller 22 as a reference image, and this reference image is temporarily stored.

Next, by means of the facial detection unit 291, facial detection processing is performed on the reference image (Step S3), and it is determined whether a face is included in the reference image (Step S4). In a case in which this determination is YES, the control transitions to Step S5, and in a case in which this determination is NO, the control transitions to Step S12.

In Step S5, by means of the facial detection unit 291, positions and sizes of all faces detected from the reference image are calculated.

Next, by means of the controller 22, the minimum of all angles of view in which all of the detected faces can be included is found, and a magnification ratio of an optical zoom corresponding to this minimum angle of view is calculated as a set magnification ratio (Step S6).

Then, by means of the controller 22, the optical zoom is driven so that the set magnification ratio is achieved (Step S7), and it is determined whether the magnification ratio of the optical zoom has reached the set magnification ratio (Step S8). In a case in which this determination is YES, the control transitions to Step S13, and in a case in which this determination is NO, the control transitions to Step S9.

In Step S9, by means of the controller 22, it is determined whether the optical zoom has reached the drive limit. In a case in which this determination is YES, the control transitions to Step S10, and in a case in which this determination is NO, the control returns to Step S7.

In Step S10, by means of the controller 22, it is notified that the optical zoom has reached the drive limit. This notification is made by way of sound, a lamp, display of characters, or the like.

Next, by means of the controller 22, it is determined whether the shutter key is pressed (Step S11), and in a case in which this determination is YES, the control transitions to Step S13, and in a case in which this determination is NO, the control transitions to Step S12.

In Step S12, by means of the controller 22, only the reference image is recorded in the storage memory 28.

In Step S13, image capturing processing is performed by the CCD 13 and an image is captured. By means of the controller 22, this captured image is set as a magnified image, and this magnified image is temporarily stored.

Then, by means of the facial recognition unit 292, calculating a matching level between the reference image and the magnified image is performed (Step S14). Then, it is determined whether the reference image corresponds to the magnified image; that is to say, it is determined whether a region corresponding to the magnified image in the reference image matches the magnified image (Step S15).

In a case in which this determination is YES, the control transitions to Step S16, and in a case in which this determination is NO, the control transitions to Step S17.

In Step S16, by means of the controller 22, the reference image and the magnified image are associated and then stored in the storage memory 28, and an optical zoom magnification ratio (image capturing magnification ratio) at a time of image capturing the magnified image is also recorded therein.

In Step S17, by means of the controller 22, the reference image and the magnified image are not associated, but are separately recorded in the storage memory 28.

FIG. 3 is a diagram showing an example of the reference images and the magnified images being associated and stored in the storage memory 28. Regarding the reference images which are images A1, A3, and A4, the image capturing magnification ratios of the magnified images are 3 times, 7 times, and 10 times, respectively.

On the other hand, regarding image A2 which is the reference image, the magnification image is "none". As to this, such cases can be considered in which it has been determined that the reference image and the magnified image do not correspond in relation to image A2, and alternatively, in which although the optical zoom has been driven so as to image a magnified image of image A2, because the drive limit had been reached, the user did not instruct image capturing of the magnified image.

FIG. 4 is a flowchart illustrating an operation of the digital camera in playback mode.

When the mode setting key mounted on the key input unit 30 is operated and playback mode is set, the controller 22 reads out a program for performing processing illustrated in the flowchart shown in FIG. 4 from program memory 14. The controller 22, in accordance with this program, performs various processing in the flowchart shown in FIG. 4.

First, by means of the controller 22, a reference image is read out from the storage memory 28, and the reference image is displayed on the display unit 26 (Step S21). Actually, the number of pixels of the display unit 26 is relatively small compared to the number of pixels of the reference image or of the magnified image, and therefore, in accordance with the number of pixels of the display unit 26, a display image is generated from the reference image, and this display image is displayed on the display unit 26.

Next, it is determined whether there is a magnified image corresponding to this read out reference image (Step S22). In a case in which this determination is YES, the control transitions to Step S25, and in a case in which this determination is NO, the control transitions to Step S23.

In Step S23, it is determined whether the zoom switch is operated, and in a case in which this determination is YES, the control transitions to Step S24, and in a case in which this determination is NO, the control transitions to Step S21.

In Step S24, in accordance with the magnification ratio set by the zoom switch, the reference image is magnified or reduced and displayed on the display unit 26, and the control returns to Step S23.

In Step S25, the image capturing magnification ratio of the magnified image is read out from the storage memory 28.

Next, the reference image is magnified to the same magnification ratio as the image capturing magnification ratio thus read out, and by replacing a region corresponding to the magnified image in the magnified reference image with the magnified image, a composite image is generated (Step S26).

Then, it is determined whether the zoom switch is operated (Step S27), and in a case in which this determination is YES, the control transitions to Step S28 and in a case in which this determination is NO, the control returns to Step S21.

In Step S28, the magnification ratio set by the zoom switch is assumed to be a display magnification ratio, and it is determined whether this display magnification ratio is greater than the image capturing magnification ratio of the magnified image. In a case in which this determination is YES, the control transitions to Step S29, and in a case in which this determination is NO, the control transitions to Step S30.

In Step S29, in accordance with the display magnification ratio set by the zoom switch, the composite image is magnified and displayed on the display unit 26, and the control returns to Step S27.

In Step S30, in accordance with the display magnification ratio set by the zoom switch, the reference image is magnified and displayed, and the control transitions to Step S27.

For example, as shown in FIG. 5(a), with a mountain as a background, an image in which four persons A to D have been captured is set as a reference image. This image is an image captured without driving the optical zoom (at magnification of one time (1×)), and in this image, from left to right, persons A to D are lined up.

In addition, as shown in FIG. 5(b), an image of a minimum angle of view including the faces of the four persons A to D is assumed to be a magnified image. The image capturing magnification ratio of this magnified image is assumed to be two times (2×).

Therefore, a composite image in this case is an image generated by replacing a region corresponding to a magnified image in the reference image magnified at two times (2×) with the magnified image.

Figure 7:
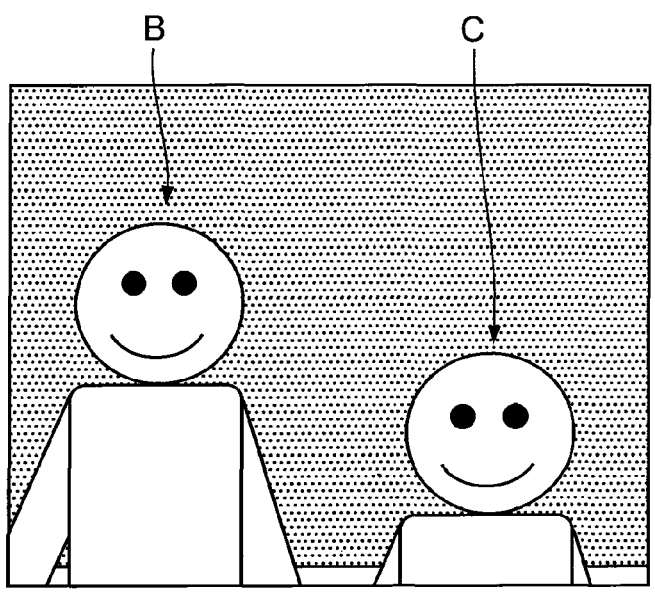
FIG. 7 is a diagram showing an example of magnifying a reference image up to a display magnification ratio, related to the embodiment.

Here, for example, if the zoom button is operated and the display magnification ratio becomes less than the image capturing magnification ratio of the magnified image, then as shown in FIG. 6, the reference image is magnified up to the display magnification ratio and displayed. Furthermore, supposing that the zoom button is operated, and the display magnification ratio is greater than or equal to the image capturing magnification ratio of the magnified image, then the composite image is magnified up to the display magnification ratio and displayed, as shown in FIG. 7. At this time, the region displayed as shown in FIG. 7 is a region replaced by the magnified image, and therefore, the resolution thereof is higher than that of the reference image magnified to the same magnification ratio.

According to the present embodiment, the following effects are provided.

(1) In recording mode, by a user pressing a shutter key only once, the digital camera 1 automatically images, in addition to a reference image including a person as a subject, a magnified image magnifying a face of this person.

In addition, a composite image, in which a portion of the magnified reference image is replaced with the magnified image, is generated. In playback mode, in a case in which the display magnification ratio specified by the zoom button is greater than or equal to an image capturing magnification ratio for the magnified image, not the reference image, but the composite image is magnified up to the display magnification ratio and displayed on the display unit 26.

With this, regarding a face of a person, an image quality of the magnified image is higher than that of the reference image, and therefore, by magnifying the composite image, it is possible to reduce capture deterioration compared to a case of magnifying the reference image. As a result, even if a face of a person is captured and the face included in this image is magnified, it is possible to suppress reduction of resolution.

(2) Since a magnified image is captured after image capturing a reference image, there is a possibility that the timing of creating the images may be misaligned, and that between the reference image and the magnified image, misalignments of facial positions or changes in expressions may occur.

Therefore, by means of the facial recognition unit 292, determining a matching level between the reference image and the magnified image is performed, and it is determined whether a region corresponding to the magnified image in the reference image and the magnified image match. In a case in which this determination is positive, the reference image is associated with the magnified image, and stored in the memory 28. As a result, even if a portion of the reference image is replaced by the magnified image and a composite image is generated, it is possible to prevent this composite image from differing greatly from the reference image.

(3) In a case in which the set magnification ratio exceeds a maximum image capturing magnification ratio possible by means of optical zooming, after magnifying the optical zoom up to this maximum image capturing magnification ratio, that fact is notified, and the user is asked whether or not to image at this maximum magnification ratio. Therefore, in accordance with a preference of the user, it is possible to image a magnified image.

It should be noted that the present invention is not limited to the above-mentioned embodiment, and modifications, improvements, and the like within a range of achieving the objective of the present invention are included in the present invention.

For example, although in the present embodiment, a reference image and a magnified image are made into a database and stored, the present invention is not limited to this, as long as the reference image and the magnified image can be stored in association with each other regardless of the storage format. For example, a tag indicating the existence or nonexistence of a magnified image may be attached to the reference image and stored.

Furthermore, while it has been described in the present embodiment, in a case in which the calculated set magnification ratio is greater than a maximum image capturing magnification ratio possible for a digital camera, this fact is notified after zoom processing is carried out up to the maximum magnification ratio of the digital camera, the present invention is not limited thereto. It is possible to notify the fact that the calculated set magnification ratio is greater than the maximum magnification ratio possible for the digital camera before performing zoom processing of the digital camera, and to ask the user whether or not to perform the zoom processing.

In the present embodiment, the notification is made after performing zoom processing up to the maximum possible image capturing magnification ratio, and therefore, in a case in which the user selects not to image the magnified image, the zoom operation becomes an unnecessary. However, if the user is asked whether or not to perform zoom processing before zoom processing up to the maximum possible image capturing magnification ratio is carried out, it is possible to reduce power consumption.

Furthermore, although in the present embodiment, it has been described that the image capturing magnification ratio of the reference image is assumed to be one time (1×), the image capturing magnification ratio may be enlarged by the optical zoom at a time of image capturing the reference image. In this case, the magnification ratio of the enlarged image to the reference image may be calculated based on the image capturing magnification ratios of the reference image and the enlarged image.

Furthermore, while it has been described in the present embodiment that a face of a person is detected by the facial detection unit 291 from the reference image and the magnified image, it is also possible to calculate a smiling face score of the face of the detected person by means of the facial recognition unit 292.

In addition, in a case in which, a smiling face score is greater than or equal to a predetermined value is calculated by means of the facial recognition unit 292 from the face of the person detected from a reference image, it is possible to perform zoom magnification processing by means of the controller 22. Additionally, in a case in which a smiling face score is greater than or equal to a predetermined value is calculated from the face of the person detected in a magnified image by means of the facial recognition unit 292, it is possible to perform recording using the storage memory 28.

While it has been described in the present embodiment that in a case in which a plurality of faces is detected by the facial detection unit 291 from the reference image, the magnification is enlarged to the degree that all of the detected faces can be included is found, the present invention is not limited thereto. It is possible that at least one face is selected from among the detected faces, and the magnification is enlarged to the maximum magnification ratio in which the selected face can be included by means of zoom magnification processing.

Furthermore, the present invention is not limited to a digital camera and, for example, may also be applied to another image capturing apparatus having a still image capturing function, such as a mobile phone terminal equipped with a camera or the like.

In addition, the present invention is not limited to a digital camera, and may also be applied to any image processing device. Moreover, the present invention can be also applied to a storage medium having stored therein a program allowing a personal computer to implement the above-mentioned functions.

What is claimed is:

1. An image capturing apparatus, comprising:
an image capturing unit which captures a first image;
a detection unit for detecting a characteristic region from the first image captured by the image capturing unit;
a calculation unit for calculating, as a set magnification ratio, a maximum magnification ratio according to which the characteristic region detected by the detection unit is included in an image capturing angle of view of the image capturing unit;
a zoom control unit for performing optical zoom magnification processing up to the set magnification ratio calculated by the calculation unit;
an image capturing control unit for controlling the image capturing unit so as to capture a second image with the image capturing angle of view that is zoom magnification processed by the zoom control unit;
a recording unit for recording the first image and the second image in association with each other;
a display magnification ratio instruction unit for specifying, as a display magnification ratio, a magnification ratio of an image displayed on a predetermined screen;
a composite image generation unit for generating a composite image, by replacing a portion corresponding to the second image in the first image with the second image;
a first determination unit for determining whether the display magnification ratio specified by the display magnification ratio instruction unit is greater than or equal to a magnification ratio of the second image to the first image; and
a display control unit for, in a case in which it is determined by the first determination unit that the display magnification ratio is greater than or equal to the magnification ratio of the second image to the first image, magnifying the composite image up to the display magnification ratio and displaying, on the predetermined screen, the composite image thus magnified, and, in a case in which it is determined by the first determination unit that the display magnification ratio is less than the magnification ratio of the second image to the first image, magnifying the first image up to the display magnification ratio and displaying the first image thus magnified on the predetermined screen.

2. An image capturing apparatus as set forth in claim 1, further comprising:
an image comparison unit for calculating a matching level between a portion corresponding to the second image in the first image and the second image; and
a second determination unit for determining whether the matching level calculated by the image comparison unit is greater than or equal to a predetermined threshold,
wherein in a case in which the second determination unit determines that the matching level is greater than or equal to the predetermined threshold, the recording unit records the first image and the second image in association with each other.

3. An image capturing apparatus as set forth in claim 1, wherein in a case in which a plurality of characteristic regions are detected by the detection unit from the first image, the calculation unit calculates, as the set magnification ratio, a maximum magnification ratio according to which all of the detected characteristic regions are included in the image capturing angle of view.

4. An image capturing apparatus as set forth in claim 1, further comprising:
a notifying unit for, in a case in which the set magnification ratio calculated by the calculation unit exceeds a maximum magnification ratio for which zoom magnification is optically possible, notifying that the maximum magnification ratio for which zoom magnification is optically possible is exceeded.

5. An image capturing apparatus as set forth in claim 1, wherein in a case in which the set magnification ratio calculated by the calculation unit exceeds a maximum magnification ratio for which zoom magnification is optically possible, the zoom control unit performs zoom magnification processing up to the maximum magnification ratio for which zoom magnification is optically possible.

6. An image capturing apparatus as set forth in claim 1, further comprising:
an image acquisition instruction unit for providing an instruction for image capturing of the second image,
wherein the zoom control unit performs the zoom magnification processing based on the instruction provided by the image acquisition instruction unit.

7. An image capturing apparatus as set forth in claim 1, wherein the detection unit detects a region in which a face of a person is included as the characteristic region.

8. An image capturing apparatus as set forth in claim 7, further comprising a smiling face score calculation unit for calculating a smiling face score of the face of the person detected by the detection unit,
wherein the zoom control unit performs the optical zoom magnification processing, in a case in which the smiling face score calculated by the smiling face score calculation unit from the first image is greater than or equal to a predetermined threshold value.

9. An image capturing apparatus as set forth in claim 8, wherein the smiling face score calculation unit calculates a smiling face score of a face, corresponding to the face of the person detected from the first image, in the second image, and
wherein the recording unit records the second image in a case in which the smiling face score calculated from the second image is greater than or equal to a predetermined value.

10. An image capturing method, comprising: an image capturing step of causing an image capturing unit to capture a first image;
a detection step of detecting a characteristic region from the first image captured in the image capturing step;
a calculation step of calculating, as a set magnification ratio, a maximum magnification ratio according to which the characteristic region detected in the detection step is included in an image capturing angle of view of the image capturing unit;
a zoom control step of performing optical zoom magnification processing up to the set magnification ratio calculated in the calculation step;
an image capturing control step of controlling the image capturing unit so as to capture a second image with the image capturing angle of view that is zoom magnification processed in the zoom control step;
a recording step of recording the first image and the second image in association with each other;
a display magnification ratio instruction step of specifying, as a display magnification ratio, a magnification ratio of an image displayed on a predetermined screen;
a composite image generation step of generating a composite image, by replacing a portion corresponding to the second image in the first image with the second image;
a determination step of determining whether the display magnification ratio specified by the display magnification ratio instruction step is greater than or equal to a magnification ratio of the second image to the first image; and
a display control step of, in a case in which it is determined in the second determination step that the display magnification ratio is greater than or equal to the magnification ratio of the second image to the first image, magnifying the composite image up to the display magnification ratio and displaying, on the predetermined screen, the composite image thus magnified, and, in a case in which it is determined in the determination step that the display magnification ratio is less than the magnification ratio of the second image to the first image, magnifying the first image up to the display magnification ratio predetermined screen.

11. A non-transitory computer-readable storage medium having stored thereon a program executable by an image capturing apparatus, to cause the image capturing apparatus to operate as:
an image capturing unit which captures a first image;
a detection unit for detecting a characteristic region from the first image captured by the image capturing unit;
a calculation unit for calculating, as a set magnification ratio, a maximum magnification ratio according to which the characteristic region detected by the detection unit is included in an image capturing angle of view of the image capturing unit;
a zoom control unit for performing optical zoom magnification processing up to the set magnification ratio calculated by the calculation unit;
an image capturing control unit for controlling the image capturing unit so as to capture a second image with the image capturing angle of view that is zoom magnification processed by the zoom control unit;
a recording unit for recording the first image and the second image in association with each other;
a display magnification ratio instruction unit for specifying, as a display magnification ratio, a magnification ratio of an image displayed on a predetermined screen;
a composite image generation unit for generating a composite image, by replacing a portion corresponding to the second image in the first image with the second image;

a determination unit for determining whether the display magnification ratio specified by the display magnification ratio instruction unit is greater than or equal to a magnification ratio of the second image to the first image; and a display control unit for, in a case in which it is determined by the second determination unit that the display magnification ratio is greater than or equal to the magnification ratio of the second image to the first image, magnifying the composite image up to the display magnification ratio and displaying, on the predetermined screen, the composite image thus magnified, and, in a case in which it is determined by the determination unit that the display magnification ratio is less than the magnification ratio of the second image to the first image, magnifying the first image up to the display magnification ratio and displaying the first image thus magnified on the predetermined screen.

* * * * *